United States Patent [19]

Bozso et al.

[11] Patent Number: 5,692,121
[45] Date of Patent: Nov. 25, 1997

[54] RECOVERY UNIT FOR MIRRORED PROCESSORS

[75] Inventors: Ferenc Miklos Bozso, Peekskill; Yiu-Hing Chan, Poughkeepsie, both of N.Y.; Philip George Emma, Danbury, Conn.; Algirdas Joseph Gruodis, Wappinger Falls, N.Y.; David Patrick Hillerud, Poughkeepsie, N.Y.; Scott Barnett Swaney, Catskill, N.Y.

[73] Assignee: International Business Machines Corporation, Armonk, N.Y.

[21] Appl. No.: 641,771

[22] Filed: Apr. 30, 1996

Related U.S. Application Data

[63] Continuation of Ser. No. 421,411, Apr. 14, 1995, abandoned.

[51] Int. Cl.⁶ .................................................. G06F 11/00
[52] U.S. Cl. .............................. 395/182.11; 395/182.09; 395/182.08
[58] Field of Search ............ 395/182.08, 182.09, 395/182.1, 182.11, 182.14, 182.15; 371/67.1, 68.1

[56] References Cited

U.S. PATENT DOCUMENTS

| | | | |
|---|---|---|---|
| 3,449,723 | 6/1969 | Anderson et al. | 395/478 |
| 3,736,566 | 5/1973 | Anderson et al. | 395/182.13 |
| 4,453,215 | 6/1984 | Reid | 395/182.09 |
| 4,486,826 | 12/1984 | Wolff et al. | 395/182.07 |
| 4,597,084 | 6/1986 | Dynneson et al. | 371/51.1 |
| 4,654,857 | 3/1987 | Samson et al. | 395/182.03 |
| 4,750,177 | 6/1988 | Hendrie et al. | 371/32 |
| 4,816,990 | 3/1989 | Williams | 395/650 |
| 4,866,604 | 9/1989 | Reid | 395/433 |
| 4,920,540 | 4/1990 | Baty | 395/185.08 |
| 4,926,315 | 5/1990 | Long et al. | 395/183.19 |
| 4,931,922 | 6/1990 | Baty et al. | 395/182.07 |
| 4,939,643 | 7/1990 | Long et al. | 395/182.07 |
| 5,020,024 | 5/1991 | Williams | 395/550 |
| 5,220,668 | 6/1993 | Bullis | 395/650 |
| 5,243,704 | 9/1993 | Baty et al. | 395/280 |
| 5,249,187 | 9/1993 | Bruckert et al. | 371/68.1 |
| 5,257,383 | 10/1993 | Lamb | 395/733 |
| 5,297,031 | 3/1994 | Gutterman et al. | 364/408 |
| 5,301,309 | 4/1994 | Sugano | 395/182.1 |
| 5,321,698 | 6/1994 | Nguyen et al. | 395/182.15 |
| 5,367,668 | 11/1994 | Pandolfo | 395/182.1 |
| 5,379,381 | 1/1995 | Lamb | 395/826 |
| 5,390,081 | 2/1995 | St. Pierre | 361/775 |
| 5,423,024 | 6/1995 | Cheung | 395/182.09 |

*Primary Examiner*—Robert W. Beausoliel, Jr.
*Assistant Examiner*—Phillip Francis Vales
*Attorney, Agent, or Firm*—Whitham, Curtis, Whitham & McGinn; Robert P. Tassinari, Jr.

[57] ABSTRACT

A method for making a processor system immune to circuit failure caused by external noise using mirrored processors, and a recovery unit integral with the method, are disclosed. Identical addresses and data information is generated in each of two processors. The data is then partitioned into registers and Error Correction Codes (ECC's) are generated for the data. The address, data, and ECC information for each processor is then interlaced in a data structure. The interlaced structures of each processor are then compared. If the comparison yields no errors, the data is checkpointed in the recovery unit; if an error is detected, a recovery sequence can be initiated after the check-stop operation, whereby the system is restored to the last error-free checkpointing operation.

17 Claims, 7 Drawing Sheets

RECOVERY UNIT FOR MIRRORED PROCESSORS

This application is a continuation of application Ser. No. 08/421,411, filed on Apr. 14, 1995, now abandoned.

BACKGROUND OF THE INVENTION

1. Field of the Invention

The present invention generally relates to RAS (Reliability, Availability, and Serviceability) architecture incorporated in data processing systems and, more particularly, to a recovery unit that provides for error detection and a method of recovery.

2. Description of the Prior Art

Most data processing systems use mechanisms for detecting (and perhaps diagnosing) errors, as well as provide for the possibility of recovering from an error. These two functions are usually distinct, requiring different hardware (and software) mechanisms.

The RAS (Reliability, Availability, and Serviceability) concept, as implemented in hardware and software, is directed to preventing or recognizing system failures (Reliability), the ability to keep the system functioning in the event of failure (Availability), and the ability to fix the failure in a non-disruptive way (Serviceability).

RAS may be addressed at various levels of system development; to diagnose design bugs during new product development, in manufacturing to identify bad parts during the system build, and to catch errors while the system is operating.

RAS may also be directed to various types of failures, including system-level design oversights, logical errors, hard failures (hardware faults), or soft errors (data errors in memory or after data transfer due to external noise or circuit failure).

In some cases it is only necessary to recognize that an error has occurred. In others it is necessary to diagnose the error, that is, to specifically identify its source. Finally, in some cases it is desirable to remove or correct the error.

A commonly used method of error detection utilizes parity codes. In a one-bit parity code the number of binary "ones" (1s) in a data word are counted. The word has odd parity if the number of 1s is odd and even parity otherwise. When a word is written into memory, the parity bit is also written. The parity bit is read and checked when the word is read out. If the stored and checked parity bits do not match, an error is detected. A one-bit parity code can detect at most one bit of error in the data item. If there are two bits of error the one-bit parity code will not detect any error since the parity will match the data with two errors.

While a one-bit parity code can detect an error, it cannot detect which particular bit in a data item is in error. Error correcting codes (ECCs), on the other hand, not only detect, but allow correction of an error. Many large memory systems use single error correcting, double error detecting (SEC-DED) code that allows detection of up to 2-bits of error and correction of a single bit of error. An error may be detected and corrected in a number of ways, including system software or by circuitry that is integral to the particular component that generates the error.

In traditional commercial-design, EDFI (Error Detection and Fault Isolation) was achieved via special checking-logic that was integral to the data flow and control. Error detection refers to the percentage of errors that could reasonably be detected, perhaps by using the parity schemes as discussed above. The error detection capability of such systems was high (e.g., 75%–90% of hardware faults detected). Fault isolation refers to percentage of errors that could be traced to a particular component. The fault isolation of these conventional systems was also good (e.g., about 90% of the errors could be traced to a single component).

While valuable for preserving data integrity, EDFI schemes are not without their disadvantages. In conventional mainframe designs, all logical circuits were checked as the system was operating. In many cases, however, the checking-logic (e.g. parity code predictors) were as complex as the circuit components (e.g, adders or shifters) themselves. This results in larger processors with circuits driving longer wires with more fan out, and generally longer cycle times.

In light of the foregoing, there exists a need for an apparatus and method to detect errors, and if an error is detected, to allow for recovery or correction of the error, while eliminating the disadvantages of high power and decreased speed associated with prior art checking-logic circuits.

SUMMARY OF THE INVENTION

The present invention is directed to an apparatus and method for detecting and correcting errors occurring in mirrored processors, which substantially obviates one or more of the problems due to the limitations and disadvantages of the related art.

In accordance with this invention, a recovery unit (R-unit) is provided for checking and recovery of errors from two processors running identical code in lock-step. The R-Unit compares the results (output operands) of the two processors on a cycle-by-cycle basis, and does a formal checkpointing or storing of those remits on a per-instruction basis.

The comparison operation provides error detection (since both processors are initially known to be working), and the checkpointing operation provides a method of recovery. In EDFI terms, error detection for the present invention is 100% (to be termed "fail-safe"), and fault isolation is zero (to be termed "no-fault"). That is, errors will be caught with 100% certainty, but the sources of the errors can not be discerned.

In operation, as the instructions produce outputs (storage or register-sink operands) in the two mirror-image processors, the R-Unit generates ECCs for the pair of outputs, and compares them to determine whether the processors have successfully generated identical outputs.

If the outputs and their ECCs are identical, then the R-Unit checkpoints one of the copies in an architected-state array. If the outputs or the generated ECCs differ, then an error is indicated, the checkpointing operation is blocked, and recovery is effected by using the checkpointed state from the architected-state array. In the recovery action, the processors are both returned to the state that is consistent with the last successfully completed instruction.

To achieve these and other advantages and in accordance with the purpose of the invention, as embodied and broadly described, the invention provides for a recovery unit for a mirrored processor, comprising means for separately storing identical data received from each of two processors. The data includes data information and address information. The data received from each processor is partitioned into a plurality of data subsets. Error correction codes (ECCs) are partitioned for each data subset of the plurality of data subsets. An interlaced is generated entity in each processor containing the data, address, and ECC information. Corresponding data subsets of the interlaced entity of each processor are compared with their respective ECCs for errors. The data subsets are checkpointed if no errors are detected. If errors are detected, a recovery sequence is initiated.

In another aspect, the invention provides for a method for making a processor system immune to circuit failure caused by external noise. The method comprises the steps of: (1) generating identical data in each of first and second processors, wherein the data includes data information and address information; (2) partitioning the data generated by each processor into a plurality of data subsets; (3) generating error correction codes (ECCs) for each data subset of the plurality of data subsets; (4) interlacing the data subsets and ECCs generated by each processor to form an interlaced entity for each processor; (5) comparing corresponding data subsets of the interlaced entity of each processor, including data, address, and ECC information, for errors; (6) checkpointing the data subsets if no errors are detected; and (7) implementing a recovery sequence if errors are detected.

It is to be understood that both the foregoing general description and the following detailed description are exemplary and explanatory and are intended to provide further explanation of the invention as claimed.

BRIEF DESCRIPTION OF THE DRAWINGS

The foregoing and other objects, aspects and advantages will be better understood from the following derailed description of a preferred embodiment of the invention with reference to the drawings, in which.

DETAILED DESCRIPTION OF THE INVENTION

Figure 1:
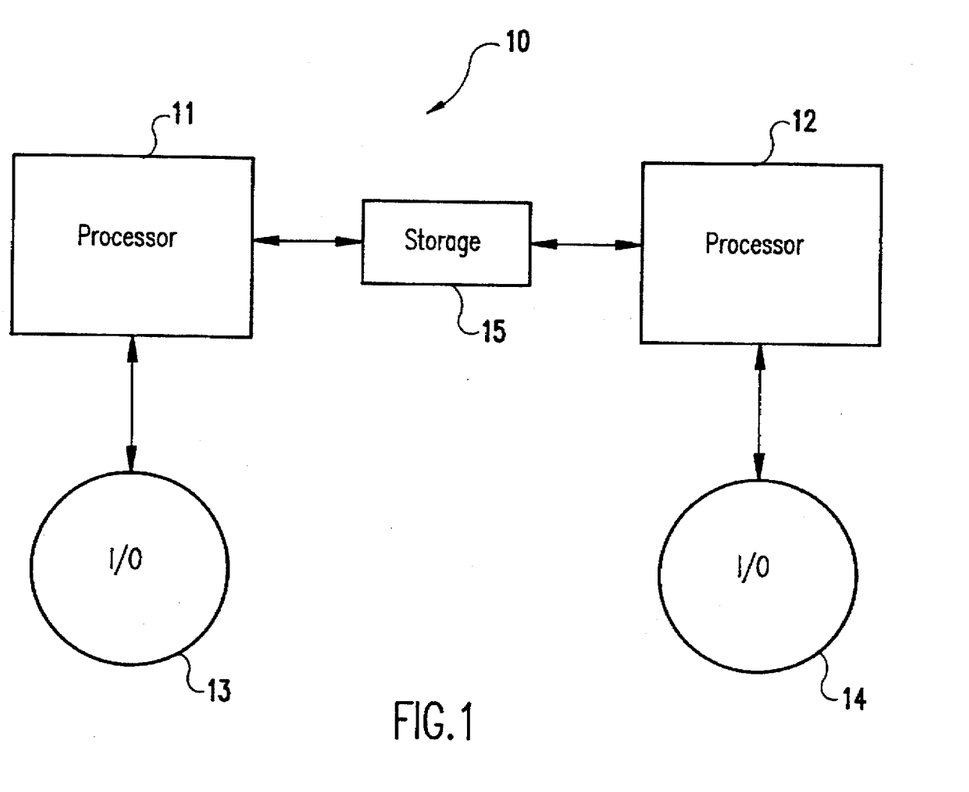
FIG. 1 is one example of a data processing system embodiment utilizing the method and system of the present invention.

Referring now to the drawings, and more particularly to FIG. 1, there is shown an exemplary data processing system employing the method and system of the present invention. As shown, the data processing system 10 includes processing units 11 and 12. The processing units have their respective input/output interfaces 13, 14 and share a common memory 15. Each processor may also have its own discrete memory. The R-Unit of the present invention may be employed with any mirrored processor implemented design, for example, in mainframe or mini-computers, personal computers, or as part of a server on a local area network (LAN).

Figure 2A:
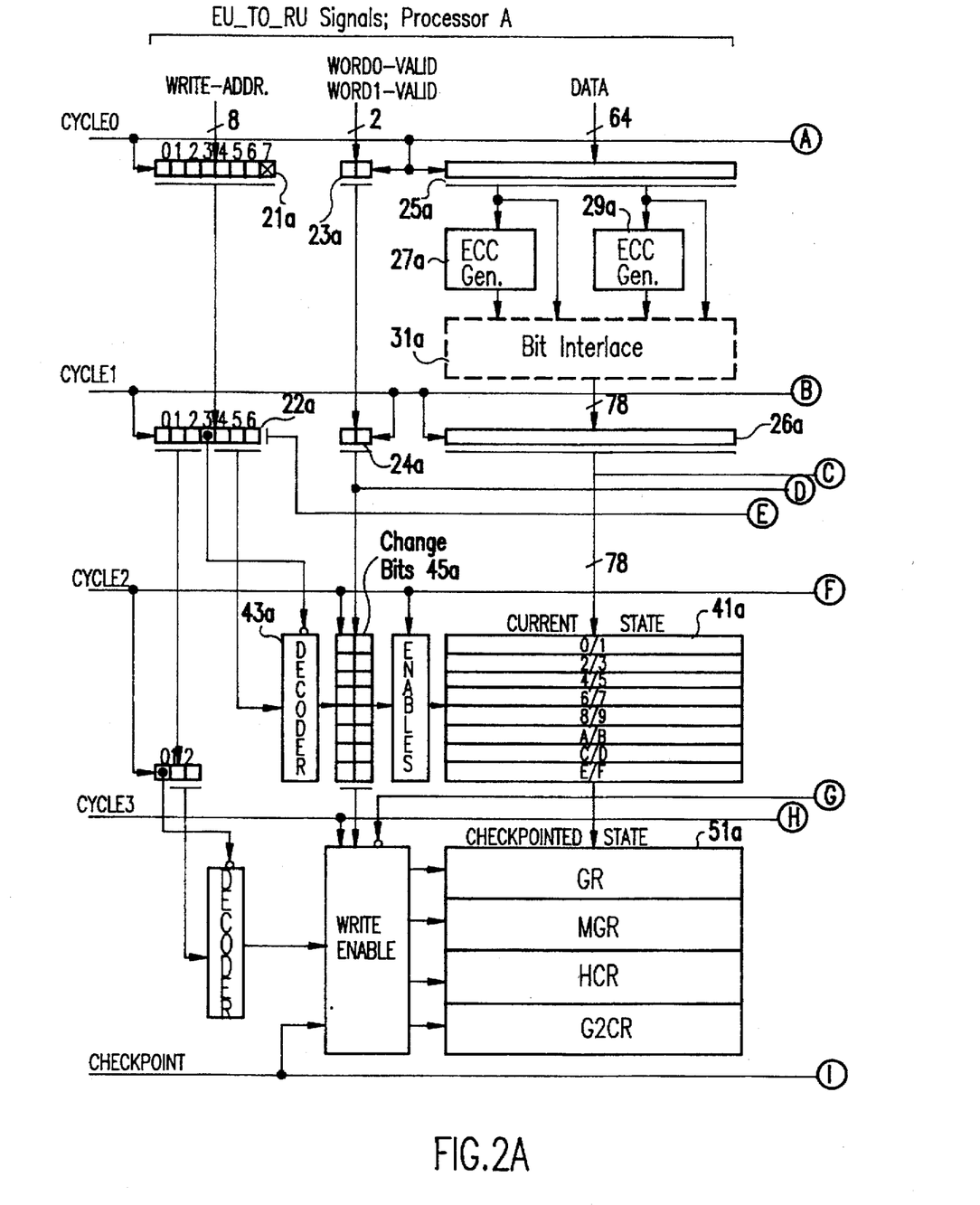
FIGS. 2A and 2B taken together, are a diagrammatical representation of the data flow of a recovery unit in accordance with the present invention.
Figure 2B:
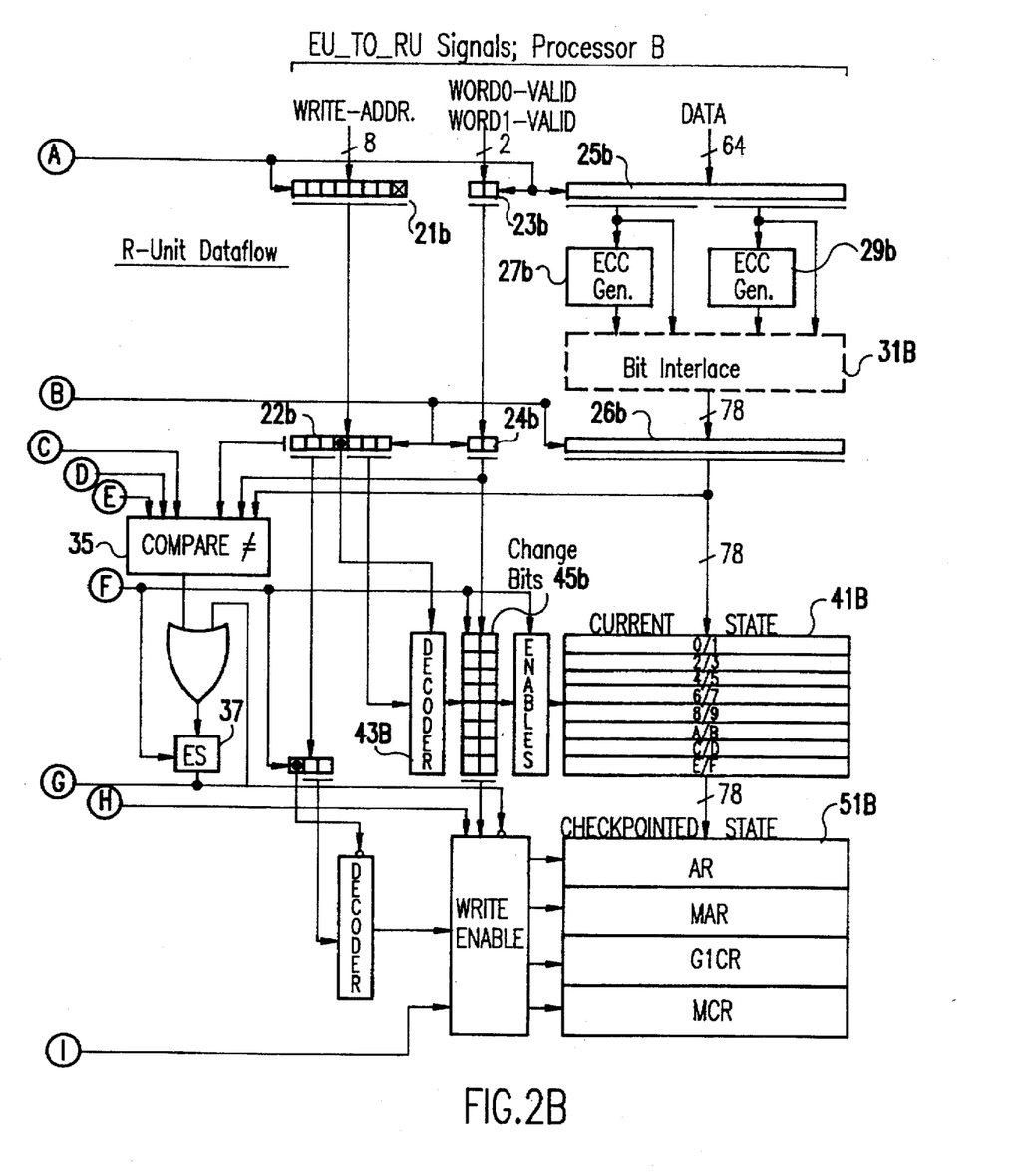

Referring to FIGS. 2A and 2B, there is depicted a diagrammatical representation of the data flow from each of two mirrored processors A and B (E-units) to the recovery unit (R-unit) for use by the exemplary data processing system of FIG. 1.

In general, the R-unit has a doubleword (8 byte/64 bit) data input, and a register address input from each processor.

On every cycle in which there is valid data on one input, there must be valid data on the other input as well. Further, the data inputs must match, and the register address inputs must match. If only one input is valid, or if both are valid and there is a mismatch, this is an error and a recovery operation is effected.

The R-unit must be able to receive word or doubleword input from the E-unit for the purposes of checkpointing, and it must be able to provide word or doubleword output to the E-unit on demand. When reads of the R-Unit state are done, it is assumed that an Instruction Unit (I-Unit) (not shown) provides the relevant register addresses. Additionally, the various instruction addresses are sent to the R-Unit by the I-Unit. One exemplary set of potential signals for doing the required operations are as follows:

EU_TO_RU_WRITE_ADDR(0:7) is the address of the R-Unit register that is to be written by the E-Unit. This address is generated by the E-Unit. The data path from the E-Unit is a doubleword and the E-Unit specifies the validity of each of the words separately via the WORD_VALID signals described below. The R-Unit will store one, or the other, or both words as appropriate.

EU_TO_RU_WORD0_VALID is a single bit indicating that Word 0 of the doubleword being sent from the E-Unit is to be written to the R-Unit register that is specified by EU_TO_RU_WRITE_ADDR(0:7).

EU_TO_RU_WORD1_VALID is a single bit indicating that Word 1 of the doubleword being sent from the E-Unit is to be written to the R-Unit register that is specified by EU_TO_RU_WRITE_ADDR(0:7).

EU_TO_RU_DATA(0:63) is the doubleword data path going from the E-Unit to the R-Unit. When a write to the R-Unit is initiated via EU_TO_RU_WRITE_ADDR(0:7) in conjunction with EU_TO_RU_WORD0_VALID and/or EU_TO_RU_WORD1_VALID, the appropriate data will be sent to the R-Unit on this bus. Note that a doubleword is always sent, but either of the words may be invalid.

EU_STATUS_VALID is a 1-bit signal that serves as the trigger for checkpointing, i.e., it indicates instruction completion. When EU_STATUS_VALID goes high, it indicates that the doubleword on EU_TO_RU_DATA (0:63) is the last doubleword (if valid) to be written by the instruction that has just completed.

As seen by the processor, the R-Unit address space comprises 8 regions, where each region comprises 16 registers, therefore having 128 registers in total. A single-byte (8 bit) address suffices to access all of them. The registers in the 8 regions are word (32 bit) registers. The 8 regions are set forth in Table 1 below:

TABLE 1

R-Unit Regions

| Half | Region | Addresses | Reg. Size | Mnemonic | Description |
|---|---|---|---|---|---|
| 0 | 0 | 00-0F | 32 Bits | GR | Program General Registers |
| 0 | 1 | 10-1F | 32 Bits | AR | Program Access Registers |
| 0 | 2 | 20-2F | 32 Bits | MGR | Millicode General Registers |
| 0 | 3 | 30-3F | 32 Bits | MAR | Millicode Access Registers |
| 0 | 4 | 40-4F | 32 Bits | HCR | Host Control Registers |
| 0 | 5 | 50-5F | 32 Bits | G1CR | Guest-1 Control Registers |

TABLE 1-continued

R-Unit Regions

| Half | Region | Addresses | Reg. Size | Mnemonic | Description |
|------|--------|-----------|-----------|----------|-------------|
| 0 | 6 | 60-6F | 32 Bits | G2CR | Guest-2 Control Registers |
| 0 | 7 | 70-7F | 32 Bits | MCR | Millicode Control Registers |

FIGS. 2A and 2B show the data flow into the R-Unit state arrays from the pair of processors A and B. In addition to the signals discussed above, the other five signals in the figure are CYCLE0, CYCLE1, CYCLE2, CYCLE3, and CHECKPOINT. These signals are generated from EU_TO_RU_WORD0_VALID, EU_TO_RU_WORD1_VALID, and EU_STATUS_VALID. Recall that EU_STATUS_VALID is used to initiate the checkpoint operation.

For ease of reference and discussion, the "uppercase" CYCLE# signals correspond to the "lowercase" Cycle # descriptions that are discussed below to describe the general operation of the system on a cycle-by-cycle basis. A more detailed description of the recovery unit components, including the Current State arrays and Checkpoint arrays, follows the cycle-by-cycle description.

Cycle 0

With reference to FIGS. 2A and 2B, in Cycle 0, EU_TO_RU_WRITE_ADDR(0:7), EU_TO_RU_WORD0_VALID, EU_TO_RU_WORD1_VALID, and EU_TO_RU_DATA(0:63), are gated into respective registers (21a, 21b, 23a, 23b, 25a, and 25b) by the signal CYCLE0 for processors A and B. EU_TO_RU_WORD0_VALID, and EU_TO_RU_WORD1_VALID are used to infer that the E-Unit is storing to the R-Unit. The signal CYCLE0, therefore, must be generated from the WORD_VALID signals.

Also, it is Bit0 of EU_TO_RU WRITE_ADDR(0:7) that indicates (Bit0=0) that the store is to be done to the word-oriented portion of the state. This bit could be used to start CYCLE0 as well; if this were done, there would be no need to drag this bit any further through the data flow.

During this cycle, word-oriented ECCs are generated (27a, 27b, 29a, 29b) for each of the two words of EU_TO_RU_DATA(0:63) for each of the two processors. Following this, the bits of the two words are interlaced (31a, 31b) for each of the two processors.

The ECC generation scheme and bit interlacing structure will now be described in greater detail. Since some instructions produce word (4 byte or 32 bit) results, ECCs are generated and checked at the word granularity, i.e., they are generated for the individual words within a doubleword. The ECC code that is generated is a single error correcting, double error detecting (SEC-DED) code. While ECCs at the word granularity require more bits than ECCs at the doubleword (8 byte or 64 bit) granularity, a word granularity avoids the complications and exposures of the read-modify-write cycle that would be required for word updates at the doubleword granularity.

Figure 3:
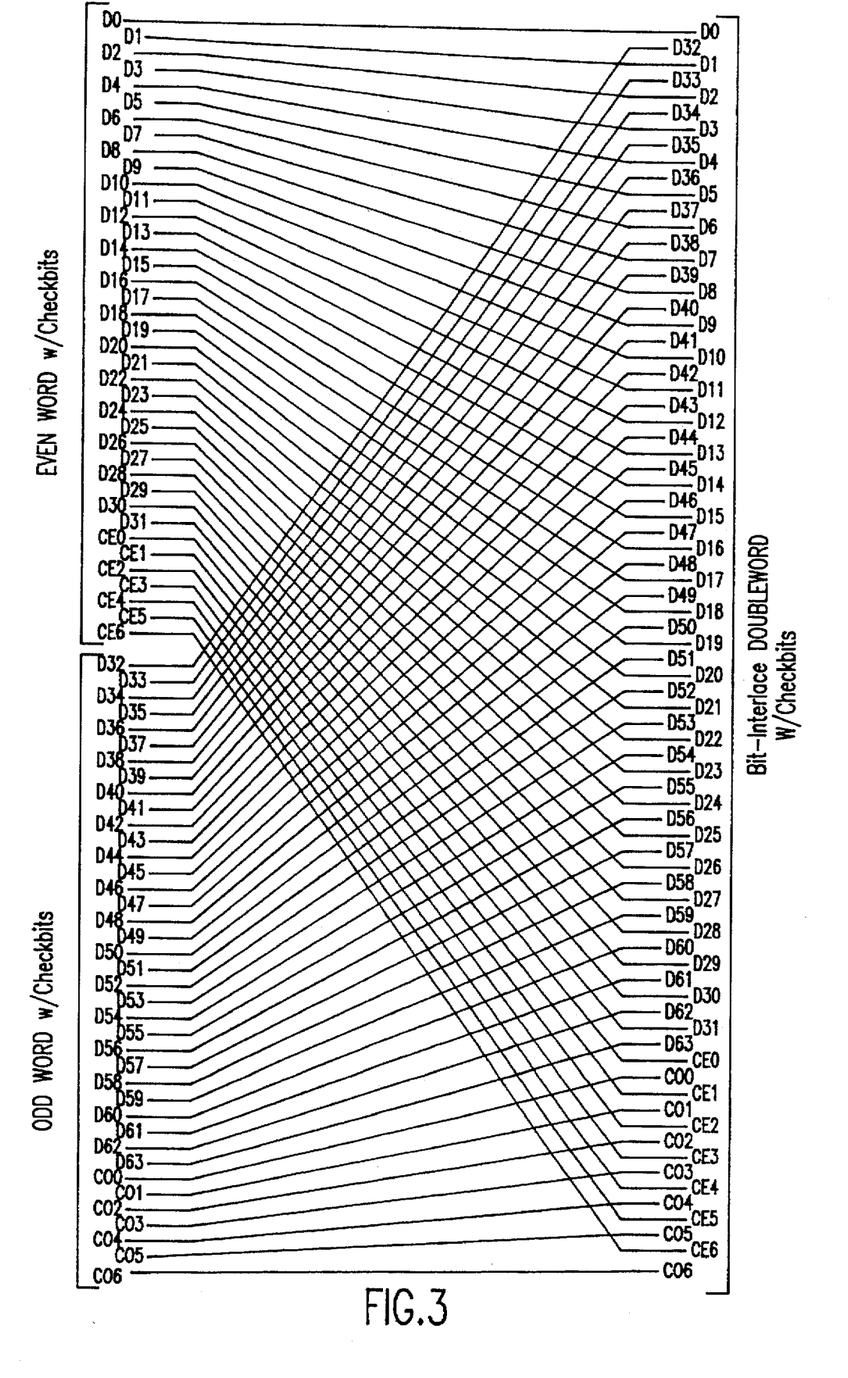
FIG. 3 illustrates a bit interlaced doubleword structure.

A further benefit of using word granularity is that the two words of a doubleword are bit-interlaced so that events that cause double-bit errors will not cause system failure. In other words, within the entire data flow, and within the arrays (discussed further below) as well, the bits of the two words within a doubleword and their corresponding ECCs are interlaced as shown in FIG. 3. That is, every other bit in the physical layout is from alternate words. With this interlacing structure, double errors involving adjacent cells are correctable, since adjacent cells are protected by independent ECCs. Moreover, many combinations of multiple errors are detectable. For example, errors in four adjacent cells of a doubleword will cause two independent detectable double errors.

The specific ECC used has 7 check-bits, therefore a 32-bit word with its check-bits requires 39 bits total. The code is shown in Table 2 below:

TABLE 2

Error Correction Code

| Byte 0 | Byte 1 | Byte 2 | Byte 3 | Check | |
|--------|--------|--------|--------|-------|---|
|          | 111111   | 11112222 | 22222233 |         | ← Bit |
| 01234567 | 89012345 | 67890123 | 45678901 | 0123456 | ← Positions |
| 11111111 | ......1. | ...1..1. | 1.....11 | 1...... | |
| ....1..1 | 11111111 | ..1..1.. | 1....1.. | .1..... | |
| ...1.... | ...1.... | 11111111 | ..11.11. | ...1... | ← Independent |
| ..1...1. | ..1..1.1 | 1....... | 11111111 | ...1... | ← Linear |
| .11..1.1 | .1..1..1 | ....1111 | .11.1... | ....1.. | ← Equations |
| 1....11. | 1...111. | 11111... | ....1... | .....1. | |
| 11.11... | 1111.... | .1.....1 | .1.1...1 | ......1 | |
| 00000000 | 00000000 | 01000000 | 00000000 | 0000000 | |
| 98266441 | 98775432 | 40335228 | 18275117 | 0000136 | ← Syndromes |
| 71597919 | 82400256 | 40872214 | 18866433 | 1248624 | |

The checkbits are constructed as the Exclusive OR (XOR) of all the bits in the corresponding row of the matrix above that are indicated by a '1' character. For example, the check-bit 0 is the XOR of data bits 0, 1, 2, 3, 4, 5, 6, 7, 14, 19, 22, 24, 30, and 31.

A data word with its code bits is checked by generating a syndrome which includes the same terms in the same 7 checksums, but it includes the check-bit in the sum. An all '0' syndrome corresponds to a word with no errors. The syndromes indicated in Table 2 correspond to the associated bit being in error; all other syndromes correspond to multiple-bit uncorrectable errors.

The generation of check-bits requires five 14-way and two 13-way XORs for each word coming from each processor. The circuitry must be distinct for each processor so as to detect errors in the ECC-generating logic. The generation of syndromes requires five 15-way and two 14-way XORs. A single set of syndrome-generating logic is used for checking hardened state as it is retrieved from the state arrays. Decoding circuitry is needed for mapping syndromes to unique bits in event of error.

In operation, the ECC result of the Word 0 from the left side is buffered on the left side, and is also sent to the right side. The ECC result of Word 1 form the right side is buffered on the right side, and is also sent to the left side. This is done for comparison purposes on the next cycle.

Also on Cycle 0, Word 0 from both sides is compared, Word 1 from both sides is compared, and the register addresses from the left and right sides are each buffered on their original sides as well as sent to the opposite side. At this point, both sides carry both copies of the register addresses in their individual data flows. At the conclusion of the cycle, CYCLE1 gates the interlaced error correction coded doubleword for each processor into a register.

Returning to FIGS. 2A and 2B, the remaining portion of EU_TO_RU_WRITE_ADDR, and the WORD_VALID bits are also copied through from the 0th-cycle registers (21a, 23a, 21b, 23b) to the 1st-cycle registers (22a, 24a, 22b, 24b). Note that Bit0 of EU_TO_RU_ADDR need not necessarily be in this flow (as discussed above). Also note that the signal CYCLE1 could be generated in part from the WORD_VALID bits that were stored by CYCLE0.

Cycle 1

During the second cycle (Cycle 1), all of the data that was latched by CYCLE1 for each processor is compared by a series of comparators 35 (see FIG. 2) between the processors. As implemented in the present embodiment, the R-Unit comparators can not detect design bugs in the system nor hardware mistakes that are common to the identical processors. The R-Unit can not identify the source of an error (the faulty processor in the event of a miscompare), nor distinguish between a circuit failure and a transmission failure (e.g., noise on the wire). The R-Unit comparators 35 perform a single function: they catch soft-errors that are not common to both processors. They specifically compare the E-Unit outputs and the Instruction Unit instruction addresses at all appropriate points in time (i.e., when those signals are valid).

If there is a miscompare, this event is recorded by a set-only "error status" (ES) flip-flop 37 (depicted in FIGS. 2A and 2B as a flip-flop with a feedback loop through an OR gate). This ES flip-flop is cleared during each successful checkpointing operation. The ES signal is used to inhibit checkpointing on the following cycle if there has been an error. If an error occurs, recovery is effected. The recover sequence is described in greater detail in Cycle 3 below. Also on Cycle 1, the two copies of the register address on each side are compared on each side.

At the end of Cycle 1, each side stores the input data doubleword that was received at that side, the ECCs that were generated for each word within that doubleword, the two register addresses from both sides (meaning that there are four copies of the register addresses present in the data flows), and the results of all comparisons in a "Current State" register 41a, 41b.

Cycle 2

In parallel with the comparison step, the interlaced doubleword from each processor is gated into a "Current State" array 41a, 41b, if appropriate, as shown in FIGS. 2A and 2B. Each interlaced doubleword contains an even-odd register pair, so there are 8 such register pairs on each side. (The Checkpointed State 51a, 51b, discussed further below, is also split into two halves—since an instruction can write 16 address registers (ARs) and 16 general registers (GRs) at the same time—so two 8-doubleword Current-State arrays are required. Since there are two processors, this fits naturally into the data flow.)

Although an instruction may write an AR and a GR (which must be checkpointed simultaneously), they will not arrive at the Current State arrays 41a, 41b on the same cycle. Bit3 of EU_TO_RU_WRITE_ADDR determines which half of the Current State is being updated on any cycle. This bit is inverted at the left decoder 43a, and left unchanged on the right decoder 43b. Bits 4–6 of EU_TO_RU_WRITE ADDR determine which of the 8 doublewords is being written, and the WORD_VALID bits from the CYCLE1 latches determine which of the words of the interlaced doubleword is to be written. These WORD_VALID bits are also copied to a two-bit field associated with each doubleword, where they act as "Change Bits" 45a, 45b.

The remaining portion of EU_TO_RU_WRITE_ADDR is copied from the CYCLE1 latches to the CYCLE2 latches at the end of the cycle. Only bits 0, 1, and 2 remain of this field (bit 0 may also have already been eliminated from the data flow on the first cycle).

Pipelining of the CYCLE0, CYCLE1, and CYCLE2 operations will continue until all of the data that are to be checkpointed by a given instruction have been written into the Current State array 41a, 41b. That is, an instruction may generate multiple doubleword outputs, and these outputs will arrive at the R-unit at a doubleword-per-cycle rate.

The checkpointing operation is triggered by the EU_STATUS_VALID signal which arrives with the last doubleword that is to be checkpointed for the instruction. Unlike the flows for the initial doublewords which end with Cycle 2, the flow for this last doubleword continues on into Cycle 3. Although the signal CHECKPOINT is shown explicitly in FIGS. 2A and 2B, in fact it could be used in the generation of CYCLE3. The CHECKPOINT signal used during Cycle 3 is merely the EU_STATUS_VALID signal delayed by 3 cycles.

Note that the amount of logical work done during the first and second cycles is relatively small. Since the role of the R-Unit is to detect errors and to provide recoverability, the circuit design should be the most conservative (least error prone) design that will perform the function.

Cycle 3

Following ENDOP, and following a successful comparison of results from the two processors, each result is checkpointed by the R-Unit. At that point, the aggregate Current State array 41a, 41b is transferred to the Checkpointed State array 51a, 51b in a final cycle if the ES flip-flop 37 indicates that no errors have occurred. Each checkpointed result is protected by ECCs so that soft errors in the checkpointed state can be corrected.

If there is a miscompare prior to checkpointing, then the checkpointing operation is inhibited, and the processor state is recoverable to the point that is consistent with the last successful checkpoint operation. Recovery is performed by small state-machines in the I-Unit and E-Unit. The I-Unit state-machine reads all 128 registers in sequence. As each register is read, the R-Unit corrects any latent soft errors. The E-Unit state-machine updates all shadow copies of these registers (i.e., the actual working registers) from the checkpointed state, and it rewrites the checkpointed state back into the R-Unit. This completely "scrubs" the processor state, and recovers the processor to the point of the last successfully completed operation.

Note that Cycle 3 (during which a transfer takes place from a Current State array to the Checkpoint array), corresponding to the completion of an instruction, can be concurrent with a Cycle 2 of the subsequent instruction. In other words, newly arriving state can be written into the Current State array on the same cycle as the successfully completed state change is transferred form the Current State array to the Checkpointed State array. In short, any location in the Current State array can be read-from and written-to in the same cycle, and the array is constructed to allow this without corrupting the output data with the input data. Operation of the Current State array must be strictly "read-then-write" for every location on every cycle.

Current State Arrays/Checkpointed State Arrays

As shown in FIGS. 2A and 2B, the transfer from the Current State arrays to the Checkpoint arrays is not generic, i.e., a datum from the Current State arrays can only go to 4 specific places in the Checkpointed State arrays. For example, the 0/1 Current State register from the Processor A side of the drawing can only go to the GR 0/1, the MGR 0/1, the HCR 0/1, or the G2CR 0/1 registers of the Checkpointed State array. For this reason, it seems practical to interlace the Current State registers 41a, 41b with the Checkpointed State arrays 51a, 51b in the physical layout.

Figure 4:
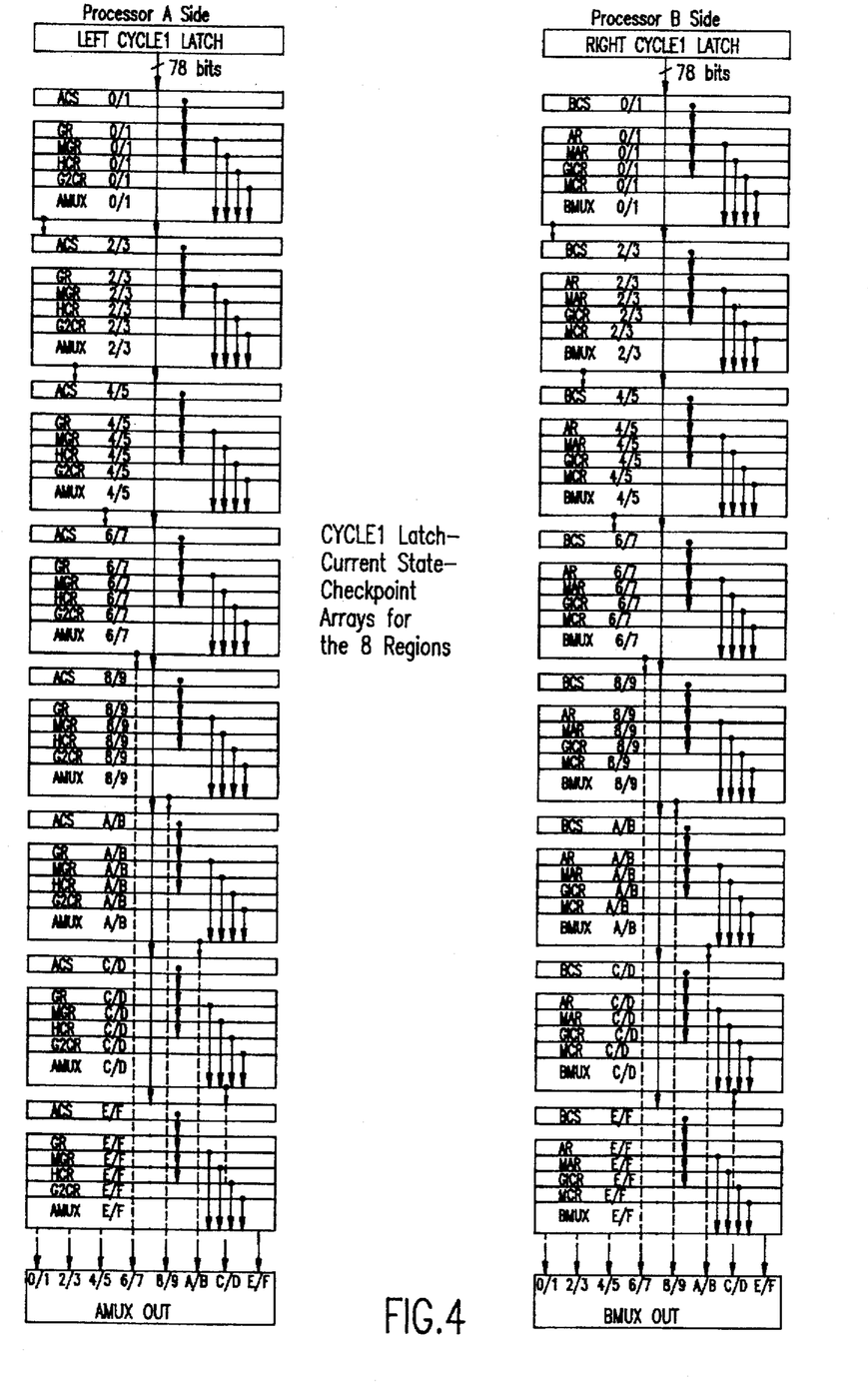
FIG. 4 is a diagrammatical representation of an embodiment of a current state register/checkpoint register latch in accordance with the present invention.

FIG. 4 shows a possible layout for this portion of the R-Unit. The left and right sides (processor A and processor B sides, respectively) of the layout are kept separate. Each CYCLE1 latch (left and right) drives 8 Current State registers. The 8 Current State registers for the processor A side are labeled ACS 0/1, . . . ACS E/F, and the 8 Current State registers for the processor B side are labeled BCS 0/1, . . . BCS E/F.

Each Current State register is physically proximate to the 4 Checkpoint registers that it drives, e.g., ACS 0/1 is put together with GR 0/1, MGR 0/1, HCR 0/1, and G2CR 0/1. This 4-register grouping also has an output multiplexor associated with it, AMUX 0/1, which is used to choose which of GR, MGR, HCR, or G2CR is to be routed to the final output multiplexor during a read operation. This final output multiplexor, AMUX OUT, is at the bottom of the entire stack, and it is driven by the 8 groupings of registers above it: 0/1, . . . E/F.

Since each side maintains its own "Current State" array, two types of registers may therefore be updated by a single instruction. The particular partitioning of the registers into left and right sides is not arbitrary. In fact, the partitioned registers were chosen to facilitate those cases where a single instruction must update registers of two types. That is, there is no instruction that updates registers of two types where both types are on the same side.

Each "Current State" doubleword register was put into a circuit macro with the 4 "Checkpointed State" doubleword registers that it was naturally associated with. This minimizes the amber of global wiring tracks needed, as well as the number of local wirelengths, which keeps the power requirements low and the size of the registers small. It also divides each side into 8 independent macros, one per doubleword (even/odd pair), where all macros can operate independently. This allows up to 16 words to be checkpointed on each side.

Each macro thus contains a current state even/odd register pair, and the 4 possible checkpointed state even/odd pairs to which the current state pair could be transferred. Each word-register of each pair has an independent ECC, and all pairs are bit interlaced. Each macro also contains the two copies of the register address bits, including a "valid bit". These address and valid bits determine which, if any, of the checkpoint state registers will be written by the current state register.

Both copies of the address and valid bits are kept all the way through the data flow stack. For example, with a bit interlaced doubleword (64 bits), the bits reading from left to right are 0/32, 1/33, . . . 30/62, 31/63. There are also 7 ECC bits with each word: C0 through C6 for the even word, and C7 through C13 for the odd word. The interlacing sequence continues for the checkbits as well, yielding indices C0/C7, C1/C8, . . . C6/C13.

In the present invention, the data flow stack is halved, with half of the checkbits being with each half. The first half contains bits 0/1, . . . 15/47 and C4/C11, . . . C6/C13. The second half contains bits 16/48, . . . 31/63 and C0/C7, . . . C3/C10. Both copies of the address and valid bits are positioned between the two halves. One half of the stack is controlled by the first copy of the address and valid bits, and the other half of the stack is controlled by the second copy of the address and valid bits. It is already known that the two copies of the address and valid bits have been compared, and are known to be equal.

As the two halves are independently controlled entities, corruption to either copy of the address bits subsequent to the comparison step will be detected. Since each half has an independent decoder circuit, an error in either decoder will be detected. Since each half has independent drivers, one could detect any differences in drivers "firing" between the two halves. The wires that drive each half are more immune to coupled noise since each half is only half as wide.

Checking the drivers could be difficult since these drivers are "fired" by the system clock. These drivers provide the clock signal that gates the system state. These signals cannot be compared in any meaningful way because the result of the comparison must be stored to a state latch at a time that is coincident with the occurrence of the signals that are being compared.

The present invention utilizes gating-signals to gate something that can be compared. Specifically, the gating-signals effect the writing of a row of latches. A latch is added to each row with its inverted output connected to its input. The drivers for the row gate this new latch whenever they gate the row. This new flip-flop then behaves as a modulo-2 counter.

The modulo-2 counter outputs from all rows in a stack-half are statically compared to the corresponding counters in the other stack-half. The results of these comparisons are all ORed together where they get gated into an error status latch on the subsequent cycle.

If either address input gets corrupted, or if either decoder circuit experiences a failure, or if any driver circuit fails, then the modulo-2 counts for the rows of each half will not agree. These drivers actually perform a checkpointing operation. If these circuits detect a problem it means that data has been corrupted, and the state is not recoverable. It also means that corruption has been immediately detected, so the processors can be checkstopped, and the damage can be contained.

Since the R-Unit is large and has numerous registers that have to be clocked or driven every cycle, large capacitances (resulting from long clock lines and gate capacitances) have to be charged and discharged every cycle. The C1/C2 master/slave clock signals are normally used to drive the registers.

To minimize power consumption in the present invention, two procedures have been implemented. First, the clocks (C1 and C2) are gated by logic functions, specifically, by the decoders as described above. This reduces the number of switching clock lines in each macro by a factor of four (i.e., only one of the four checkpoint register pairs could possibly be indicated by the address bits). C1 and C2 are nonoverlapping clocks that drive an L1/L2 (latch1/latch2) master/slave pair, respectively. Specifically, the address information in the Cycle 1 latches is used to gate the clocks of the "Current State" latches, and the address information of the Current State latches is used to gate the clocks of the Checkpointed State latches.

To avoid races which could cause incorrect latching, C1 clocks are only gated by stable L2 data (not by L1 data), and C2 clocks are only gated by stable L1 data (not by L2 data). This prevents spurious signals.

In order to accomplish this, a second decode function was provided so that one decoder is driven by L1 data and a second decoder is driven by L2 data. In addition, the data flow pipeline is extended by one more cycle. The address information is not functionally required beyond the "Current State" cycle (CYCLE #2).

Another way to save power is to shut off the "Current State" valid bits on a checkpointing cycle. The individual macros therefore do not checkpoint the same valid data over and over. Only those macros functionally involved with a checkpoint operation fire clocks.

The clock gating and valid bit power saving operations just described will now be discussed in greater detail with reference to FIGS. 5 and 6.

The R-Unit latches are Master/Slave latches [hereafter referred to as L1/L2 pairs]. The L1 Master latch is clocked by a C1 clock; the L2 Slave latch is by a C2 clock. C1 and C2 are logical inverses, with the proper edge removal done so that they do not overlap.

Since the R-Unit Checkpointed arrays comprise numerous long registers, the charging and discharging of the long C1 and C2 clock lines requires a substantial amount of power. To reduce power consumption, these lines are gated by logical decodes of address information so that clock lines only switch when there is new data to gate in.

In the preceding cycle-by-cycle description, the data input step was called "Cycle 0," and the next step was "Cycle 1." The clocks are not gated on these cycles; that is, the Cycle 0 and Cycle 1 latches accept new data (whether it is valid or not) on every cycle. The gating of clocks begins with "Cycle 2" in which "Current State" information is accepted, and continues through "Cycle 3," which is the checkpointing step. It is these last two cycles that involve large numbers of registers.

Figure 5:
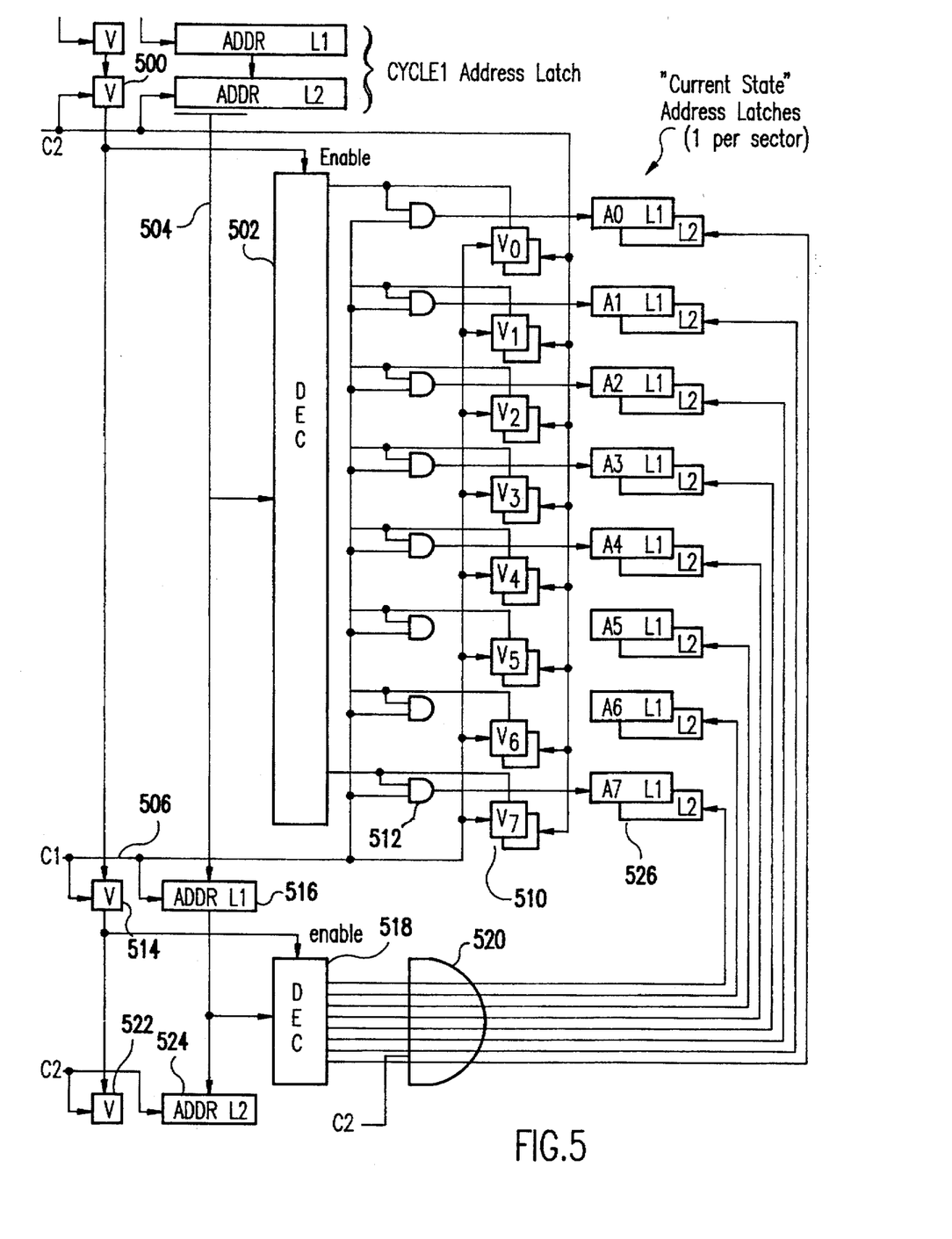
FIG. 5 is a diagrammatical representation of the Current State array L1 latches, and gated C2 clocks in accordance with the present invention.

FIG. 5 illustrates the gating of clocks. "Gating a clock" refers to disabling it by sending it through an AND gate, i.e., the clock is ANDed with the output of a combinational circuit, and the clock pulse is only allowed to occur if that combinational circuit allows it to.

To gate clocks without causing spurious signals on the clock lines, the inputs to the combinational circuit must be stable throughout the duration of the clock pulse that is being gated. Since these inputs are themselves the outputs of L1/L2 latches that are gated by the same clocks, the following rules govern the operation of the clocks:

1. The gating of C1 clocks can only be done with combinational functions of state in L2 latches.
2. The gating of C2 clocks can only be done with combinational functions of state in L1 latches.

FIG. 5 begins with a "Cycle 1" L1/L2 latch. Recall that there is a Cycle 1 latch in each of the 2 data stacks (see FIG. 4) and that each data stack contains 8 regions, where a region comprises a "Current State" L1/L2 latch, and 4 "Checkpointed State" L1/L2 latches. FIG. 5 illustrates the address flow for one of those stacks.

If and only if there had been valid data input into the Cycle 1 latch—indicated by the valid bit in the "Cycle 1" L2 latch 500—is the decoder circuit 502 enabled. The decoder circuit 502 can produce at most a single '1' on its output lines, and it can only produce a '1' if the enable input from latch 500 is high. The decoder circuit 502 decodes the high-order address bits of the address in the Cycle 1 L2 latch 504.

The "Current State" valid bits 510 are latched on every cycle, that is, the C1 clocks to these L1 latches are not gated. These valid bits 510 are merely the stored state of the decoder 502 outputs. These valid bits will be used to degate the clocks in the checkpointing step as described later.

The decoder 502 outputs are used to degate the C1 clocks though the column of AND gates 512. This causes a new address to be latched into one of the 8 sectors only when there had been valid data in the Cycle 1 latch.

The valid bit and the high-order address bits from the "Cycle 1" L2 latch are stored into subsequent L1 latches 514 and 516. This L1 state is used to perform the same degating function of the C2 clocks by another decoder 518 and column AND gates 520 (drawn for simplicity as a representative single AND gate covering the decoder output bus).

The L2 latches 522 and 524 associated with the L1 latches 514 and 516 serve no functional purpose. They are merely part of the L1/L2 pair. The purpose of the L1 latches 514 and 516 is merely to extend the "Cycle 1" address by a further half cycle so that it can be used to degate the L2 clocks that gate in the new current state.

Figure 6:
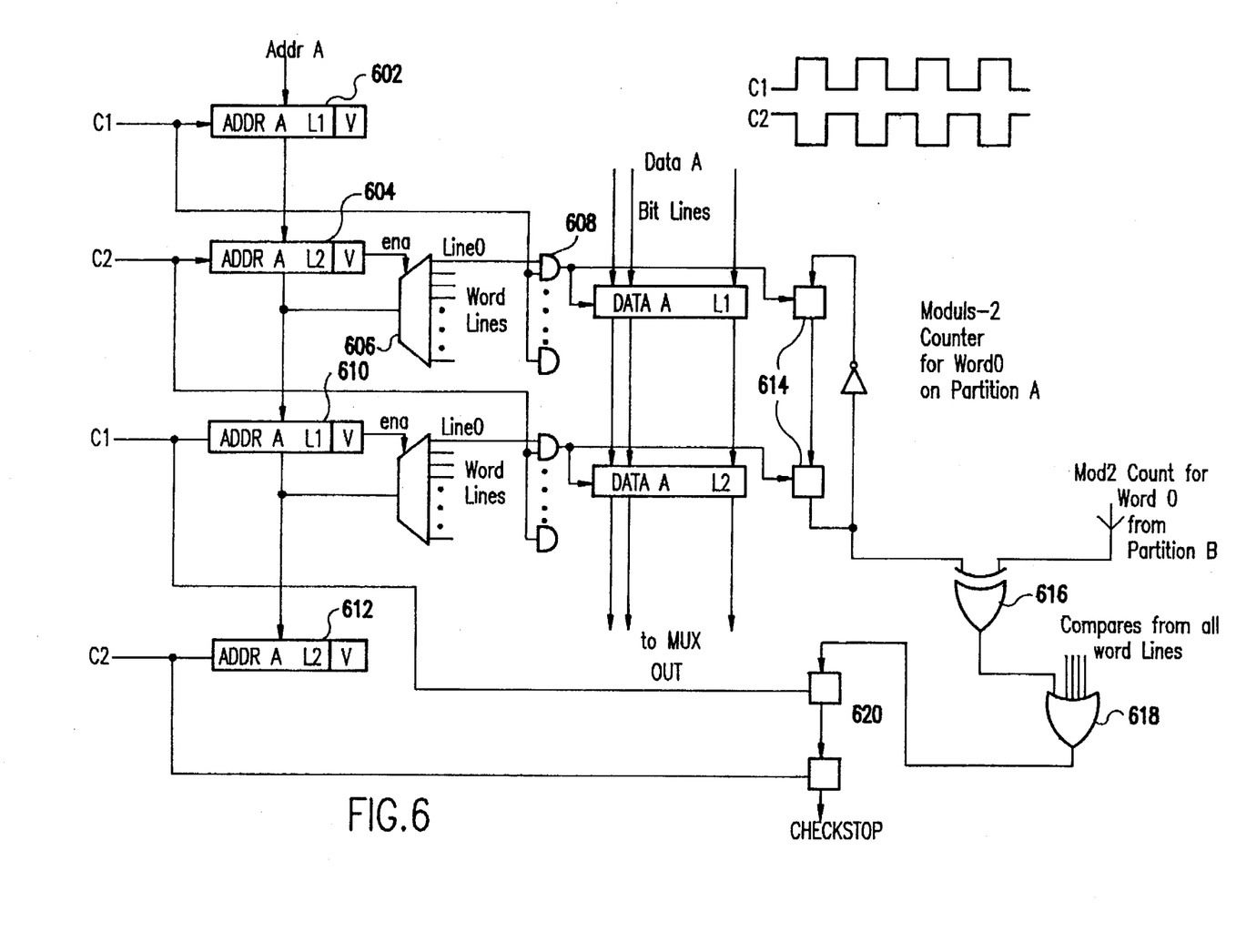
FIG. 6 is a diagrammatical representation of the clock gating signals in accordance with the present invention.

FIG. 6 illustrates the same decoding scheme extended through the checkpointing operation. The L1/L2 Address/Valid latches 602 and 604 represent the address and valid bit latch for the current state in 1 of the 8 regions in one half of the bit stack. That is, the L1/L2 pair 602 and 604 in FIG. 6 is one of the address latches in column 526 of FIG. 5 together with its corresponding valid bit from column 510.

As shown in FIG. 6, decoder circuit 606 decodes the L2 address state, and the L2 valid state is used to enable the decoder 606. These outputs are used to gate the C1 clock through the column of AND gates 608. These gated C1 clocks cause the data input to be stored into the correct L1 checkpoint latch if and only if there is valid data that is meant for that particular latch as enforced by the valid bits and address gating as described above.

Like the Cycle 1 state in FIG. 5, the Current State in FIG. 6 is extended an additional half cycle into the checkpointing cycle via the L1 latch 610. This L1 latch is used to gate the C2 clocks associated with the checkpointing operation. As before, the L2 portion of this latch 612 serves no functional purpose as they are merely part of the L1/L2 pair.

FIG. 6 also illustrates how the checking of the decoder circuits and the line drivers is accomplished. As mentioned in preceding text, the data flow for each side of the bit stack is not really the single data flow that was described in FIG. 5. In fact, the data flow on each side is partitioned into two parts. Each partition contains half of the data bits and ECC bits, and a copy of the address from one of the original inputs. The two partitions use address information from the two different inputs. This address information was compared during Cycle 1, and the addresses were known to be the same at that time. The ensuing disclosure describes how subsequent corruption to one of those copies, or how hilum of one of the clock drivers is detected.

Originally, the dataflow was partitioned into 2 halves so as to keep the clock lines short, so as to make them less susceptible to coupled noise. The two partitions are driven with independent address lines and decoder circuits. FIGS. 5 and 6, therefore, actually show only one of the partitions in the stack half. The other partition functions in the same manner.

To check that the decoder circuits in both partitions decoded the same address, and to check that the proper gated clock signal actually did fire, and to check that no other unselected clock signal fired (e.g., due to a corrupted address, or a bad decode, or coupled noise affecting the line), an additional L1/L2 latch 614 was added to the end of every word line in both partitions of every sector. This latch is scanned to an initial value of '0'. The input to the L1 is the inverted output of the L2. This makes the latch function as a modulo-2 counter, i.e., its state is the parity of the number of times that the clocks for that word line were fired.

The parity should agree between the partitions for every word-line in the R-Unit. The XOR gate 616 compares the state of this latch 614 to the state of the corresponding latch from the other corresponding partition. The OR tree (drawn as a gate) 618 takes the OR of all word lines in the sector, and then for all sectors, and then again for both bit stacks. The output of the OR tree is clocked into another latch 620.

If latch 620 is ever turned on, it indicates that somewhere in the R-Unit, only half of a word was stored (in one partition only), or that the two halves of a word were stored into registers having different addresses—at least one of which was wrong. In either case, the R-Unit state has been corrupted by this operation, and the original data cannot be reconstructed.

Latch 620 indicates that a Checkstop be taken (i.e., that the processors be stopped for good). This will contain the damage and prevent further corruption from permeating the database and software system.

While the invention has been described in terms of the embodiments described above, those skilled in the art will recognize that the invention can be practiced with modification within the spirit and scope of the appended claims.

Having thus described my invention, what we claim as new and desire to secure by Letters Patent is as follows:

1. A method for making a processor system immune to failure caused by external noise, said processor system having first and second identical processors running identical code in lock-step mode, including a recovery unit containing one or more checkpoint registers, each of said checkpoint registers having first and second partitions, the method comprising the steps of:

generating address data in each of said first and second processors;

generating identical operand data in each of said first and second processors;

initiating a fail-safe, no-fault error detection and recovery procedure comprising the steps of partitioning the operand data generated by each of said first and second processors into respective first and second pluralities of data subsets, generating error correction codes (ECCs) for each data subset of said first and second pluralities of data subsets, bit interlacing the data subsets and corresponding ECCs to form an interlaced entity for each of said first and second processors, and dividing each interlaced entity and loading the divide interlaced entities into first and second partitions of corresponding first and second current state registers; and concluding said fail-safe, no-fault error detection and recovery procedure by the further steps of comparing corresponding portions of the divided interlaced entities of each of said first and second processors and said address data, if all comparisons are equal, then checkpointing said first partition of an interlaced entity from said first processor stored in a first partition of said first set of current state registers into a corresponding first partition of a checkpoint register specified by said address data from said first processor, and checkpointing said second partition of the interlaced entity from the second processor stored in a second partition of said second set of current state registers into said second partition of the checkpoint register specified by said address data from said second processor, wherein said address data from said first and second processors is known to have been equal at the time of the comparison step, and if not all comparisons are equal, then implementing a recovery sequence.

2. A method as recited in claim 1, wherein said recovery sequence includes the steps of reading data subsets from the last checkpointing step;

regenerating ECCs for the data subsets;

correcting any errors detected by said ECC regeneration step;

updating working registers of each processor with the corrected data subsets;

rewriting the corrected data subsets back into checkpoint arrays rereading the rewritten data;

rechecking, by ECC circuitry, said rewritten data; and effecting a check-stop operation if a previously corrected error persists.

3. A method as recited in claim 1, wherein each of said current state registers having a plurality of rows and latches, further comprising the step of selectively disabling of clocks of the current state latches to save power by using a decoded address input to the current state registers.

4. A method as recited in claim 3, further including the step of selectively disabling the decoders as determined by valid bits associated with the address information.

5. A method as recited in claim 1, wherein the checkpointing step further includes the step of selectively disabling of clocks of the checkpoint state latches to save power by using a decoded address input to the checkpoint state registers.

6. A method as recited in claim 5, further including the step of selectively disabling the decoders as determined by valid bits associated with the address information.

7. A method as recited in claim 1, wherein each said checkpoint state register portion in each partition is augmented by a single bit register associated with said checkpoint state register portion, said register having its inverted output connected to its input, said register initially containing a value of zero and thereafter providing a modulo-2 count of the number of times that said checkpoint state register portion has been stored to.

8. A method as recited in claim 7, further including the step of comparing the counter outputs from both partitions for each checkpoint state register in the checkpoint state array to determine whether both partitions have performed identical checkpointing operations.

9. A method as recited in claim 8, further including the step of checkstopping the processor if the checkpointing operations in both partitions are determined to be different.

10. A recovery unit for a processor system including first and second identical processors running identical code in lock-step mode, comprising:

one or more of checkpoint registers, each of said checkpoint registers having first and second partitions;

means for separately storing identical operand data received from each of two processors;

means for initiating a fail-safe, no-fault error detection and recovery procedure, said creating means further comprising means for partitioning the operand data received from each of said first and second processors into respective first and second pluralities of data subsets, means for generating error correction codes (ECCs) for each data subset of said first and second pluralities of data subsets, and means for bit interlacing the data subsets and corresponding ECCs to form an interlaced entity for each of said first and second processors, and means for dividing each interlaced entity into first and second partitions and loading the divided interlaced entities into corresponding partitions of first and second sets of current state registers; and means for concluding said fail-safe, no-fault error detection and recovery procedure, said concluding means further comprising means for comparing corresponding portions of the divided interlaced entities of each of said first and second processors, means for checkpointing, if no errors are detected by said means for comparing, said first partition of an interlaced entity from said first processor stored in a first partition of said first set of current state registers into a corresponding first partition of a checkpoint register sniffed by address data from said first processor, and checkpoint said second partition of the interlaced entity from the second processor stored in a second partition of said second set of current state registers into said second partition of the checkpoint register specified by said address data from said second processor, wherein said address data from said first and second processors is known to have been equal at the time of the comparison is made by said means for comparing, and means for recovery initiated by said means for comparing if errors are detected by said means for comparing.

11. A recovery unit as recited in claim 10, wherein said recovery means includes an instruction unit state machine and an execution unit state machine cooperating with the recovery unit.

12. A recovery unit as recited in claim 10, wherein said means for checkpointing includes means for latching each of said current state registers with a corresponding plurality of checkpoint registers, and wherein said current state registers and checkpoint registers are doubleword registers.

13. A recovery unit as recited in claim 12, further including means for comparing information in said current state registers and checkpoint registers of each processor.

14. A recovery unit as recited in claim 10, further including means for gating clocks of each row of current state register latches of each processor.

15. A recovery unit as recited in claim 14, further including counting means coupled to each said register wherein said counting means is incremented whenever the register to which it is coupled is stored into.

16. A recovery unit as recited in claim 15, further including means for comparing counter outputs generated by the gated clocks for each row of registers.

17. A recovery unit as recited in claim 13, further including means for gating clocks of checkpoint state latches in the checkpoint state registers.

* * * * *